United States Patent [19]
Bird

[11] Patent Number: 6,083,382
[45] Date of Patent: Jul. 4, 2000

[54] WATER DESALINATION SYSTEM

[76] Inventor: Mark Bird, 5400 W. Cheyenne, Apt. 1040, Las Vegas, Nev. 89108

[21] Appl. No.: 09/007,285

[22] Filed: Jan. 14, 1998

[51] Int. Cl.[7] .................................................. B01D 61/06
[52] U.S. Cl. ..................... 210/96.2; 210/416.3; 210/143; 210/170; 210/258; 210/261; 415/3.1
[58] Field of Search ................................... 210/651, 143, 210/145, 154–155, 162, 747, 170, 806, 255, 259–261, 263, 383, 519, 520, 196–197, 190, 264–265, 661, 765, 523, 96.2, 416.3, 258; 60/398, 641.8, 641.11, 641.15; 415/2.1, 3.1, 4.3, 4.5; 136/291, 244

[56] References Cited

U.S. PATENT DOCUMENTS

| | | |
|---|---|---|
| 745,439 | 12/1903 | Holcomb et al. . |
| 1,132,775 | 3/1915 | Hille . |
| 3,464,360 | 9/1969 | Jellesma . |
| 4,141,825 | 2/1979 | Conger ...................................... 210/23 |
| 4,170,436 | 10/1979 | Candler . |
| 4,239,449 | 12/1980 | Bauer . |
| 4,245,949 | 1/1981 | Candler . |
| 4,297,217 | 10/1981 | Hines et al. . |
| 4,326,840 | 4/1982 | Hicks et al. . |
| 4,338,197 | 7/1982 | Bolton . |
| 4,421,461 | 12/1983 | Hicks et al. . |
| 4,462,389 | 7/1984 | Osdor . |
| 4,495,424 | 1/1985 | Jost ........................................... 290/53 |
| 4,540,528 | 9/1985 | Haegeman ................................ 261/91 |
| 4,772,385 | 9/1988 | Yamada et al. ........................... 210/87 |
| 5,186,610 | 2/1993 | Pennington et al. ...................... 417/61 |
| 5,425,858 | 6/1995 | Farmer ..................................... 204/149 |
| 5,507,943 | 4/1996 | Labrador ................................. 210/136 |

OTHER PUBLICATIONS

Grolier, Inc.: *The Encyclopedia Americana* vol. 2, 1996, p. 215.

Mark Bird, *Las Vegas Review–Journal/Sun,* "Tap an ocean, help a river?", Sep. 8, 1991, 4C p. 1.

Mark Bird, *Southwest Lawn & Landscape,* Summer 1992, "Nevada's Water Future: Desalting or a 300 Mile Pipeline?".

Mark Bird, *Spectrum,* "Desalination: Future of Utah water?".

Mark Bird, *Water Conditioning & Purification,* "Tidal–Solar Desalination For The U.S.?", Feb. 1993.

Mark Bird, *Water Conditioning & Purification* , "Seawater Purification in a Warming World," Jul. 1995.

Mark Bird, *Las Vegas Sun,* "Desalination could solve water woes," Apr. 15, 1991.

Metropolitan Water District of Southern California, *MWD Report No. 1084,* "Seawater Desalination Plant for Southern California," Oct. 1993.

*Primary Examiner*—Matthew O. Savage
*Assistant Examiner*—Terry K. Cecil
*Attorney, Agent, or Firm*—Thorpe, North & Western, LLP

[57] ABSTRACT

A system and method for producing potable water from a brine source uses an Archimedean screw to elevate water to an elevated point. The water is then filtered to desalinate the water through a series of filters arranged in a vertical shaft using gravity to move the water through the filters. The vertical nature of the screw and shaft reduce land requirements and costs. A power source turns the screw and relies on renewable energy sources, such as solar, wind, and tidal/wave power. A turbine is used to recapture any energy in the descending water. The screw, renewable energy power source, and turbine reduce the energy requirements and costs. A brine recycling system recovers the removed brine and various elements and minerals are separated.

9 Claims, 2 Drawing Sheets

WATER DESALINATION SYSTEM

BACKGROUND OF THE INVENTION

1. Field of the Invention

The present invention relates to a system and method for purifying or desalinating water while conserving natural resources, such as fossil fuels, minerals, and land, and making use of renewable energy sources, such as solar, wind, and tidal power. More particularly, the present invention relates to a system and method having an Archimedean screw to elevate water from a brine source and a vertical series of filters for desalinating the water as gravity moves the water through the filters. Renewable energy sources are used to power the Archimedean screw and a turbine is used to recapture some of the energy from the descending water to power the screw. The system occupies a small surface area to conserve land and recovers brine salts and minerals from the desalination.

2. Prior Art

The necessity of water for sustaining life, combined with the limited supply of usable water, make water a valuable resource or commodity in numerous parts of the world. Many areas of the world have been repeatedly plagued with droughts leading to famine and disease. The lack of water, or use of poor quality water, causes or transmits diseases such as malaria, cholera, diarrhea, typhoid, hepatitis, dysentery, etc. Even in prosperous agricultural areas, water rights and shares cause contentions, strife, and litigation.

Despite its essential nature, fresh water appears to be a declining resource. Two factors contributing to the decreasing water supply include population growth and global warming. As the population grows, less water is available per person from existing water sources. Global warming refers to the probability that the earth is subject to hotter temperatures, due at least in part to the growing use of fossil fuels which produce global warming gases. Climatologists have asserted that the consequences of higher temperatures will include hotter summers, irregular weather patterns, reservoir evaporation and agricultural stress. Another factor contributing to the lack of fresh water includes industrial pollution of water systems. Therefore, increased population, global warming/climate changes, and pollution are combining to reduce the amount of water available per person.

Many solutions have been proposed to remedy the dwindling water supply. Such solutions include water conservation programs and devices, and the construction of new reservoirs, pipelines, etc. These proposals have several disadvantageous. For example, conservation techniques and water storage are both limited by current water resources. With a growing population and limited water supply, the shortage gap will continue to increase. Water conservation will undoubtedly remain an important factor; however, there is a limit to the amount of existing fresh water that can be stored and conserved. Furthermore, dams, pipelines and other structural solutions damage the environment and displace wildlife.

Another well known solution to the decreasing water supply is desalination of salt water. Desalination involves the removal of salt, or brine, from salt water to produce potable, or drinkable, water. Desalination is attractive due to its potential to convert the largest source of water, the ocean, into usable water. Desalination appears particularly promising for many cities with coastal locations. Despite its promise and potential, however, desalination has failed to emerge as a prevailing solution or source of fresh water. Perhaps the biggest factor discouraging expansion of desalination utilities is the high cost associated with the process.

There are many desalination methods for removing salt from salt water. Current desalination methods include distillation, crystallization, electro dialysis, and reverse osmosis. The disadvantages of these methods and systems are that they are either not sufficiently developed and/or are too expensive. For example, large amounts of energy are consumed in most desalinization process, making the commercialization cost prohibitive compared to other fresh water sources. Furthermore, many of these systems require large areas of land, which is usually unavailable in coastal areas with large populations. In fact, land costs have been specifically identified as one of the largest costs of desalinization.

Other desalination proposals include microbial, solar, hydrogen, and even nuclear fusion. Microbial desalting refers to eliminating sodium in seawater similar to a bacterium altering sodium ions during respiration. Solar desalting refers to the use of either solar panels or solar cells to desalt water. Hydrogen desalting refers to the process of using the hydrogen in water as a power source to desalt water. Nuclear fusion desalting refers to a potentially benign process which uses the latent power of the atom.

Despite the above existing and proposed methods for desalination, a cost effective solution has not yet emerged. Therefore, it would be advantageous to develop a system and method to produce potable water from a brine or other water is source. In addition, it would be advantageous to develop such a system and method to produce potable water while conserving energy. In addition, it would be advantageous to develop such a system and method to produce potable water while conserving natural resources, such as fossil fuels, land, minerals, water, etc. In addition, it would be advantageous to develop such a system and method to produce potable water that makes use of renewable energy sources, such as solar, wind, and tidal power. In addition, it would be advantageous to develop a system and method for desalinating water and recovering the brine for other uses.

OBJECTS AND SUMMARY OF THE INVENTION

It is an object of the present invention to provide a system and method for purifying water.

It is another object of the present invention to provide a system and method for desalinating water.

It is yet another object of the present invention to provide such a system and method that requires minimal energy.

It is yet another object of the present invention to provide such a system and method that conserves energy.

It is yet another object of the present invention to provide such a system and method that conserves land and minimizes environmental damage.

It is yet another object of the present invention to provide such a system and method that conserves minerals and recycles the brine removed during desalination.

It is yet another object of the present invention to provide such a system and method that makes use of renewable energy sources to conserve fossil fuels and reduce energy costs.

It is yet another object of the present invention to provide such a system and method that reduces the cost of providing potable water from a brine source.

These and other objects and advantages of the present invention are realized in a system and method using an Archimedean screw to raise the water to an elevated level and then feed the water to a series of filters arranged in a vertical shaft. The Archimedean screw has an elongated, inclined shaft that extends between a brine source and the elevated level to transport water from the source to the elevated level. A rotatable auger is disposed in the cylinder and raises the water from the brine source to the elevated level as it rotates. The auger may rotate within the cylinder or the cylinder and auger may rotate together.

A power source is coupled to the auger for rotating the auger and raising the water. The power source is responsive to renewable energy sources, such as solar, wind, and tidal/wave power. The use of renewable energy sources reduces the amount of fossil fuels required, and thus conserves energy.

The cylinder has an inlet passage with a series of increasingly fine membranes. The membranes filter the water as it passes through the membranes and into the cylinder to remove debris and contaminants.

A vertical shaft extends downwardly from the inclined cylinder and includes a series of filters for desalinating the water. The force of gravity moves the inclined water through the filters. The filters are arranged vertically in the shaft. The vertical configuration of the filters and shaft give the shaft a width that is small relative to the height of the shaft. Thus, the vertical shaft occupies a relatively small area of land. The vertical configuration of the shaft and the screw reduces the amount of land required for the system and conserves land and the environment.

A turbine is disposed at the bottom of the vertical shaft for recapturing any energy of the descending water. The energy recovered is used to assist in rotating the auger. The use of a turbine to recover energy conserves energy.

A brine recovery system is disposed at the bottom of the vertical shaft for recovering the brine removed during desalination. The brine recovery system may include electrical or chemical systems for separating various elements and minerals. The brine recovery system conserves natural resources.

A control system monitors and adjusts various aspects of the system. For example, the control system may monitor and adjust the water flow rate and the rotation speed of the auger. The system may also monitor saline content, temperature and pressure at various points, energy produced by the solar panels, wind turbines, and tidal/wave devices.

The combination of the above elements of the present invention together reduce the cost of producing potable water. The land required for the system is reduced, and the environment preserved, by the vertical configuration of the screw and shaft. The power required for the system is reduced, and energy conserved, by using the Archimedean screw, a power source that utilizes renewable energy sources, and a turbine to recapture any energy. The removed brine is recycled and various elements and minerals separated. It is currently perceived that the present system and method represent a cost savings of more than 90 percent over conventional desalination techniques.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention.

Figure 1:
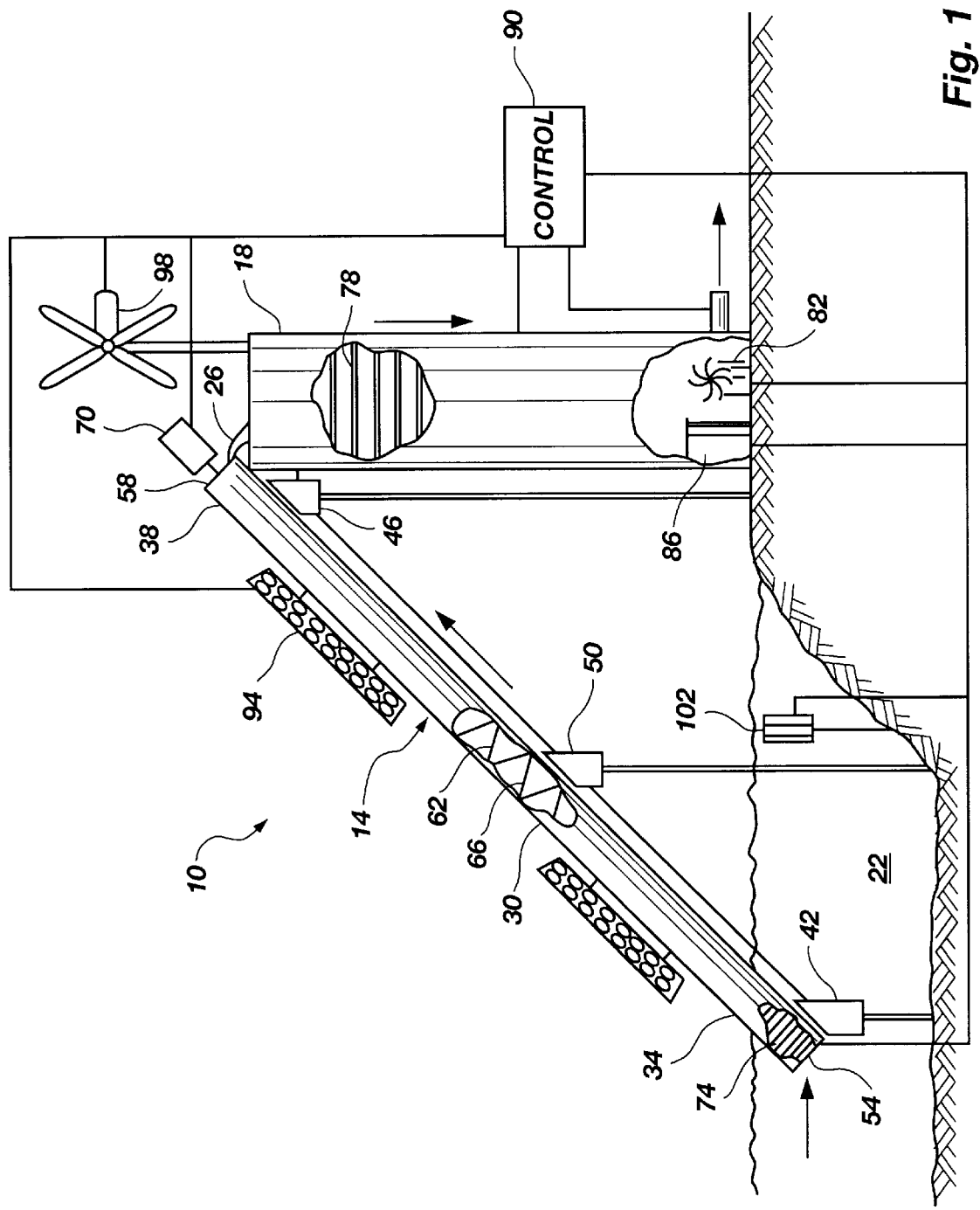
FIG. 1 is a schematic view of a preferred embodiment of a system for producing potable water of the present invention.

The system and method of the present invention involves producing potable water, or drinkable, fresh water, from a brine or saltwater source. As illustrated in FIG. 1, the desalination system 10 of a preferred embodiment of the present invention is shown. The system 10 advantageously has an Archimedean screw 14 for elevating water and a vertical shaft 18 used in desalinating the water. The screw 14 elevates water from a brine source 22, such as the ocean, to an elevated level 26. The elevated level 26 may be a hilltop or the top of the vertical shaft 18. Other existing forms of elevated structures may be modified to facilitate conversion of naturally occurring Kinetic energy to potential energy available for subsequent processing as designated hereafter.

The Archimedean screw 14 has an elongated inclined cylinder 30 extending from the brine source 22 to the elevated level 26 for transporting water from the brine source to the elevated level. The cylinder 30 has a lower end 34 and an upper end 38. The lower end 34 may be disposed on a lower support structure 42 which is secured to the ground or sea floor. Alternatively, the lower support structure 42 may be a flotation device holding the lower end 34 of the cylinder 30 by bouancy. The upper end 38 of the cylinder is disposed on an upper support structure 46. The upper support structure 46 may be existing topography, or buildings or structures otherwise secured to the ground. Alternatively, the upper support structure 46 may be the vertical shaft 18 which also services water descent.

The cylinder 30 may be further supported by an intermediate support structure 50. The intermediate support structure 50 may be secured to ground, may extend between the lower and upper support structures 42 and 46, as illustrated, or may be formed integrally with the cylinder. The cylinder 30 also has an inlet 54 at the lower end 34 through which water passes into the cylinder and an outlet 58 at the upper end 38 through which the water exits the cylinder. The cylinder 30 and support structures 42, 46 and 50 are preferably and advantageously made of light weight and low cost materials, such as plastics and composites, which are less expensive than traditional materials, such as cement and steel pipe.

The Archimedean screw 14 also has a rotatable auger 62 disposed in the cylinder 30. The rotatable auger 62 rotates, drawing water into the cylinder 30 and raising the water to the elevated level 26. The auger 62 is a screw with one or more helical blades 66. The helical blades 66 may be disposed on an axle (not shown) disposed generally in the center of the cylinder. The axle and blades 66 rotate within the cylinder. Alternatively, the blades 66 may be attached to the inner wall of the cylinder 30, with the cylinder, blades, and auger rotating together. In such a case, the cylinder would be rotatably disposed on the lower, upper, and intermediate support structures 42, 46 and 50. Like the cylinder, the auger 62 is preferably and advantageously made of light weight low cost materials, such as plastics and synthetics.

The Archimedean screw of the present invention takes advantage of advances in materials and computer aided modeling and analysis. Thus the screw may be tailored to the particular application and conditions for optimal performance. For example, the angle of the inclined cylinder, the diameter of the cylinder, the number and pitch of the auger blades, and design and materials may be matched to certain desired operating conditions. Such operating conditions may include flow rate, saline content, contaminant content, fluid temperature and pressure at various stages, etc.

The auger 62 is rotated by a power source 70 coupled to the auger. The power source advantageously is responsive to the forces of nature, or renewable energy sources, as discussed below. The power source 70 may be a motor, or may be a mechanical linkage coupled to renewable energy sources for directly rotating the auger. Most conventional desalination facilities require large amounts of energy and utilize fossil fuels. The large amounts of energy required by conventional facilities make the cost of producing drinkable water very expensive. Therefore, by utilizing renewable energy sources, the desalination system of the present invention is able to produce water in a cost effective manner.

It is to be understood that the cylinder/auger and power source may be staged as several cylinders and augers with separate power sources arranged in a series to raise the water. As the power source 70 rotates the auger 62, water is drawn into the cylinder 30 and raised through the cylinder to the elevated level.

The desalination system 10 has a series of membranes 74 associated with the cylinder 30. The membranes 74 are preferably disposed at the inlet passage 54 of the cylinder and are sized with increasingly fine openings to filter the water as it passes through the membranes 74 and inlet passage 54 prior to entering the cylinder. The membranes 74 remove debris and other contaminants and prevent or minimize the entry of other extraneous substances and wildlife into the cylinder.

Purification occurs as the water descends through the vertical shaft 18 after being raised to the elevated lever 26 by the Archimedean screw 14. The vertical shaft 18 extends downwardly from the elevated level 26 and the upper end 38 of the inclined cylinder 30. A series of conventional filters 78 are positioned within the shaft 18 to desalinate the water. The system 10 of the present invention advantageously uses the force of gravity to move the elevated water through the series of filters 78.

The series of filters 78 advantageously are configured in a vertical arrangement in the vertical shaft. The width of the shaft 18 should be substantially smaller than the height of the shaft. Because the filters 78 are arranged vertically, the vertical shaft 18 occupies a relatively small area of land compared to conventional, horizontal facilities. Most conventional desalination facilities have horizontal configurations. These facilities occupy a relatively large area of land to produce sufficient quantities of water. Land, however, is very expensive in coastal areas where the desalination systems are most likely to be located. Therefore, by utilizing a vertical configuration, the desalination system of the present invention represents a significant cost savings over conventional systems.

Although the vertical shaft of the present invention has been described and illustrated as using a series of filters for desalinating the water, it is of course understood that other desalination means or purifying means may be used. For example, an evaporation system may be used.

The desalination system 10 advantageously has a turbine 82 associated with the vertical shaft 18. The turbine 82 is preferably disposed at the bottom of the shaft 18. The turbine 82 recaptures some of the energy of the descending water. The energy recaptured by the turbine 82 is preferably used to assist in rotating the auger 62, or may be sold for commercial uses. The turbine 82 may also be used to produce electric power with a generator, which in turn may be used to power a motor which rotates the auger. Recapturing energy of the descending water is one example of how the system of the present invention conserves energy and reduces the power requirements, and thus the cost of producing potable water. Other energy recapture means may include, for example, a water wheel. The water wheel may be mechanically coupled to the auger to rotate it.

The desalination system 10 has a brine recycling system 86 associated with the vertical shaft 18. The brine recycling system 86 is preferably disposed at the bottom of the shaft or at a nearby location. This system recovers the brine and mineral removed from the descending water during desalination in the vertical shaft. Many of the elements of the periodic table and minerals are found in seawater. The brine recycling system may include chemical or electrical separation systems for separating elements and minerals from the recovered brine. The recovered brine may be used to obtain salt, construction products, ceramic glazes, food preservers, food seasoning, highway deicer, livestock feed, meat packing, medicines, oil refining, refrigeration, sewage treatment, soda ash, textile dies, water softening, and chlorine, cosmetic, glass, paper, pottery, rubber, and sodium products. The brine recovery system is another example of how the present invention conserves natural resources.

The desalination system 10 of the present invention also includes a control system 90. The control system 90 monitors and adjusts the flow of water. The control system may also monitor the saline content of the water, temperature and pressure of the water at various stages, etc. In addition, the control system may monitor and adjust the auger rotation, energy use of the power source, power produced by the renewable energy sources and turbine, etc. The control system may be a computer and utilize conventional sensors for detecting conditions such as the flow rate.

As described above, the power source 70 of the desalination system 10 advantageously is responsive to the forces of nature, or other renewable energy sources such as solar, wind, and tidal/wave power. The desalination system 10 may include solar panels 94 for producing electricity for rotating the auger 62. The solar panels 94 may be disposed on the inclined cylinder 14. By disposing the solar panels on the inclined cylinder, the small surface area requirements, or land conservation, of the system are preserved. Alternatively, the solar panels may be disposed on the ground, but are preferably located where land is less expensive.

The desalination system 10 may include wind turbines 98 for producing electricity for rotating the auger 62. The wind turbines 98 may be disposed on the top of the vertical shaft 18. By locating the wind turbines on the vertical shaft, the small surface area requirements of the system are preserved. Alternatively, the wind turbines may be disposed on the ground, but are preferably located where land is less expensive.

The desalination system 10 may also include wave and/or tidal driven devices 102 for rotating the auger. The wave/tidal devices may be disposed under or around the inclined cylinder. By locating the wave/tidal devices under the cylinder, the small surface area of the system is preserved. The use of renewable energy sources to power the auger is another example of how the desalination system of the present invention conserves energy.

The desalination system 10 of the present invention advantageously combines several low cost elements to produce affordable, potable water. It is presently contemplated that the system and method of the present invention result in a cost savings of more than 90 percent over conventional desalination facilities. The Archimedean screw and vertical desalination shaft are vertically oriented, thus reducing surface area requirements, conserving expensive and beautiful coastline property, and reducing desalination costs. The vertical and inclined nature of the Archimedean screw also allows the desalination system of the present invention to be utilized in otherwise challenging locations, such as coastal areas with steeply inclined shores or cliffs. The inclined cylinder may extend from the water to a cliff top, hill top, or elevated shore line. In addition, the vertical shaft may utilize cliff or steep hill as structural support, thus reducing construction and material costs. It is of course understood that the screw and shaft may extend several hundred feet into the air and that the vertical shaft may extend underground as well.

Conventional desalination facilities, however, have a more horizontal configuration. This horizontal nature requires a large surface area, or large amount of expensive coastal property, to produce sufficient quantities of water. In addition, these facilities damage the environment and their miles of pipes and concrete are aesthetically displeasing. Therefore, the system of the present invention conserves land and preserves the environment in addition to reducing the cost of producing water.

The desalination system of the present invention also conserves energy. In addition to the vertical nature of the Archimedean screw, the screw also has a reduced dependancy on, or reduces the amount of, power and fossil fuels used. The power source rotating the screw relies instead on renewable energy sources, such as solar, wind, and wave/tidal power. This reliance on renewable energy sources reduces the dependency on expensive fossil fuels. In addition, less pollutants and global warming gases are released. Furthermore, the system of the present invention utilizes a turbine to recapture any energy from the descending water so that no energy is wasted. Therefore, the system of the present invention conserves energy.

The combination of the above elements of the present invention together reduce the cost of producing potable water. The land required for the system is reduced, and the environment preserved, by the vertical configuration of the screw and shaft. The power required for the system is reduced, and energy conserved, by using the Archimedean screw, a power source that utilizes renewable energy sources, and a turbine to recapture any available energy. The removed brine is recycled and various elements and minerals separated.

Figure 2:
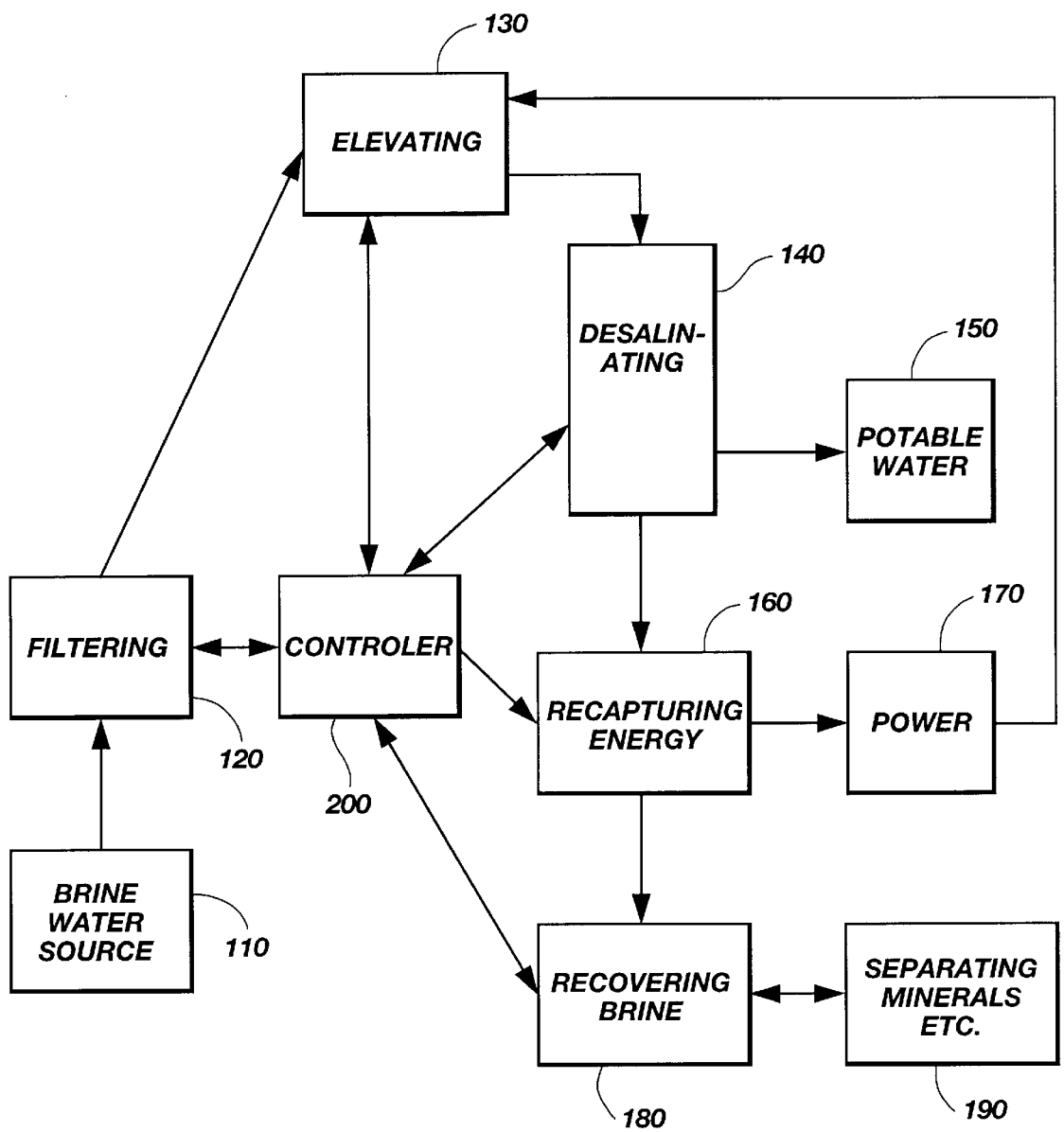
FIG. 2 is a schematic diagram of a preferred embodiment of a method for producing potable water of the present invention.

As illustrated in FIG. 2, the method of the present invention includes the steps of (1) drawing the water from a brine water source 110 through a series of increasingly fine membranes 120 to filter debris and contaminants; (2) elevating 130 the filtered water through an inclined cylinder to an elevated level by rotating an auger using the forces of nature, or renewable energy sources, such as solar, wind, and/or tidal/wave power; (3) conducting the elevated water through a vertical series of filters 140 to desalinate the water using the force of gravity to move the water through the filters, thus obtaining potable water 150; (4) conducting the water through an energy recapture means 160 for recapturing energy from the descending water to assist in rotating the auger, and to produce energy 170; (5) recovering the brine 180 removed form the water during desalination and separating minerals 190 or elements from the brine; and (6) monitoring 200 the flow of the water. Step (6) may also include monitoring other aspects of the method, such as saline consentration of the water, and may adjust certain aspects of the invention, such as the flow rate or rotation of the auger.

Although the system and method of the present invention has been described and illustrated as desalinating water from a brine source, it is of course understood that the system of the present invention may be used to purify water from other water sources.

It is to be understood that the described embodiments of the invention are illustrative only, and that modifications thereof may occur to those skilled in the art. Accordingly, this invention is not to be regarded as limited to the embodiments disclosed, but is to be limited only as defined by the appended claims herein.

What is claimed is:

1. A system for purifying water from a water source while conserving energy, natural resources, and area of ground used, the system comprising:

an elongated inclined cylinder extending from the water source to an elevated level for transporting water from the water source to the elevated level;

a rotatable auger disposed in the cylinder for drawing the water into the cylinder and raising the water through the cylinder to the elevated level;

inlet and outlet passages formed in the cylinder, said inlet passage including a series of increasingly fine membranes associated with the cylinder for filtering the water as it passes through the inlet passage to remove debris and contaminates;

a vertical shaft coupled to the outlet passage and extending downwardly from the elevated level and including purifying means to purify the water in response to downward movement under force of gravity, a width of the vertical shaft being substantially smaller than a height of the shaft to minimize the area of ground used;

a water turbine disposed at a bottom of the shaft for recapturing some of the energy of the descending purified water to assist in rotating the auger;

a wind turbine disposed on the vertical shaft positioned above the purifying means and the water turbine;

a solar panel disposed on the inclined cylinder;

a wave driven device disposed under the inclined cylinder, thereby minimizing the area of ground used; and a power source coupled to the auger for rotating the auger in response to energy from said wind turbine, said solar panel, and said wave driven device.

2. The system of claim 1, further comprising a control system for monitoring and adjusting the flow of water.

3. The system of claim 2, wherein the control system includes means for monitoring and adjusting the rotation of the auger.

4. The system of claim 1, further comprising a brine recovery means disposed within the vertical shaft below the purifying means for recovering brine removed from the water during purification in the vertical shaft.

5. The system of claim 4, further comprising a control system for monitoring the saline concentration of the water.

6. A desalination system for producing potable water from a brine source while conserving energy and natural resources, the system comprising:

an elongated inclined cylinder extending from the brine source to an elevated level for transporting water from the brine source to the elevated level;

a rotatable auger disposed in the cylinder for drawing the water into the cylinder and raising the water through the cylinder to the elevated level;

inlet and outlet passages formed in the cylinder, said inlet passage including a series of increasingly fine membranes associated with the cylinder for filtering the water as it passes through the inlet passage and membranes to remove debris and contaminates;

a vertical shaft coupled to the outlet passage and extending downwardly from the elevated level and including a series of filters to desalinate the water in response to downward movement under force of gravity, a width of the vertical shaft being substantially smaller than a height of the shaft to minimize area of ground used;

a wind turbine disposed on the vertical shaft positioned above the filters;

a solar panel disposed on the inclined cylinder to minimize the area of ground used;

a power source coupled to the auger for rotating the auger in response to energy from said wind turbine and said solar panel;

a water turbine disposed within a bottom of the vertical shaft for recapturing some of the energy of descending water to assist in rotating the auger;

a brine recovery means disposed within the vertical shaft below the filters for recovering the brine removed from the water during desalination in the vertical shaft; and a control system including means for monitoring and adjusting the flow of water, thereby producing potable water from the brine source while conserving energy and natural resources.

7. The desalination system of claim 6, wherein the power source comprises a wave driven device disposed below the inclined cylinder for rotating the auger.

8. The desalination system of claim 6, wherein the control system monitors the saline concentration of the water.

9. The desalination system of claim 6, wherein the control system monitors and adjusts the rotation of the auger.

* * * * *